United States Patent [19]

Wieland et al.

[11] 4,141,672

[45] Feb. 27, 1979

[54] DUAL OR MULTISTREAM TURBINE

[75] Inventors: Kurt H. Wieland, Rolling Hills Estates; James C. Noe, Canoga Park; Terence P. Emerson, Redondo Beach, all of Calif.

[73] Assignee: The Garrett Corporation, Los Angeles, Calif.

[21] Appl. No.: 793,992

[22] Filed: May 5, 1977

Related U.S. Application Data

[62] Division of Ser. No. 572,543, Apr. 28, 1975, abandoned.

[51] Int. Cl.² .................................. F01D 9/06
[52] U.S. Cl. .......................... 415/202; 60/597; 60/605; 415/1
[58] Field of Search ............... 415/101, 1, 182, 183, 415/184, 185, 186, 187, 202, 205, 219 A, 219 C; 417/380, 405, 406, 407; 60/597, 602, 605

[56] References Cited

U.S. PATENT DOCUMENTS

| | | | |
|---|---|---|---|
| 2,204,169 | 6/1940 | Zerkowitz | 415/202 |
| 2,526,281 | 10/1950 | Ryan et al. | 415/184 |
| 2,701,528 | 2/1955 | Angell | 417/407 |
| 3,221,491 | 12/1965 | Koenig et al. | 60/597 |
| 3,270,495 | 9/1966 | Connor | 60/602 |
| 3,292,364 | 12/1966 | Cazier | 415/205 |

Primary Examiner—C. J. Husar
Attorney, Agent, or Firm—Jack D. Puffer; Joel D. Talcott; Albert J. Miller

[57] ABSTRACT

A turbine is disclosed which is adapted to receive and utilize fluid from multiple sources simultaneously. The fluid from each source is utilized optimumly by providing a section of the turbine adapted for the characteristics of each fluid source.

12 Claims, 10 Drawing Figures

Fig. 9.
Fig. 10.
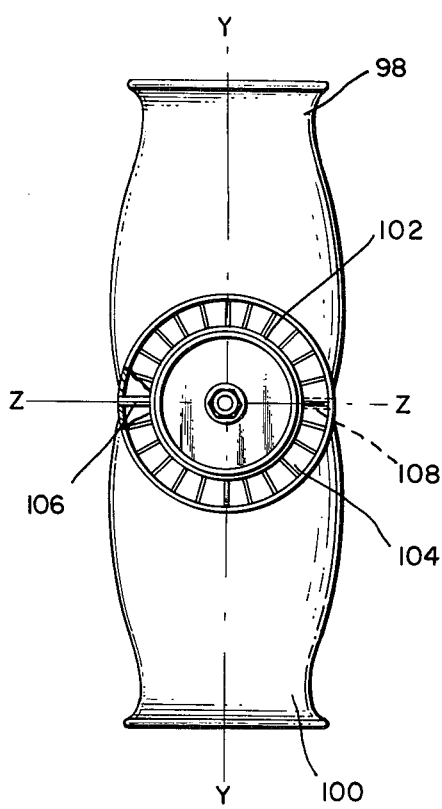
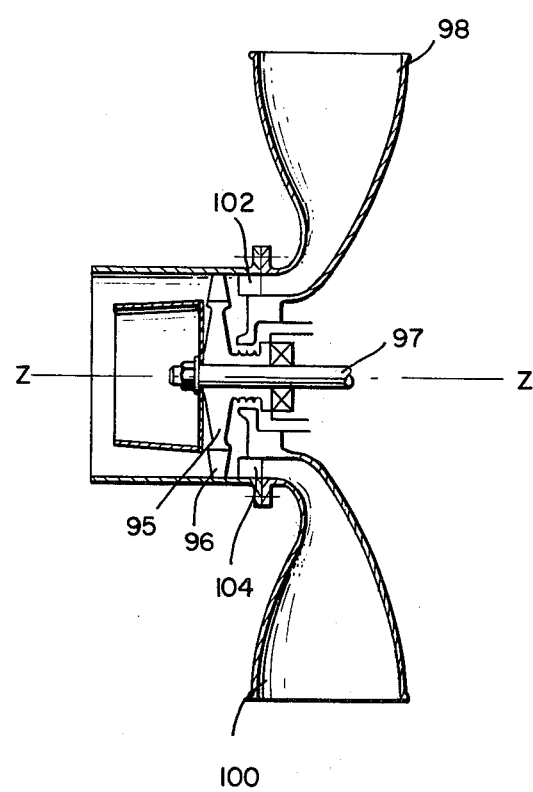

DUAL OR MULTISTREAM TURBINE

This is a division of application Ser. No. 572,543 filed Apr. 28, 1975 now abandoned.

BACKGROUND OF THE INVENTION

This invention relates to turbomachinery systems in general and in particular to turbomachinery systems in which two or more sources of working fluid are required to be used simultaneously. These working fluids may be provided at different temperatures, pressures and velocities and thus require handling within the system each in a different manner.

In the prior art devices of this type, a separate piece of rotating machinery was provided for each fluid source. If the machinery to utilize the fluid were a turbine there would be provided multiple turbines, one for each fluid source to be used. Thus, as the number of fluid sources increased the complexity and cost of the system was increased and the reliability substantially decreased.

The present invention overcomes these disadvantages by providing a single turbine which is adapted to accept multiple streams of varying fluids simultaneously. Thus a single piece of rotating machinery can accommodate a variety of fluid sources.

SUMMARY OF THE INVENTION

This invention provides a fluid turbine for utilizing multiple fluid streams in which separate inlet nozzles or vanes are provided for handling each fluid. Thus each fluid may be directed to that portion of the turbine which will provide the optimum utilization of the fluid energy. The invention may be utilized in radial inflow turbines or axial inflow turbines and may provide for separation of the fluid streams or merging of the streams in their expansion through the turbine.

BRIEF DESCRIPTION OF THE DRAWINGS

FIG. 9 is a view of a dual source housing for an axial turbine; and

FIG. 10 is a sectional view taken along line Y—Y of FIG. 9.

DESCRIPTION OF THE PREFERRED EMBODIMENTS

Figure 1:
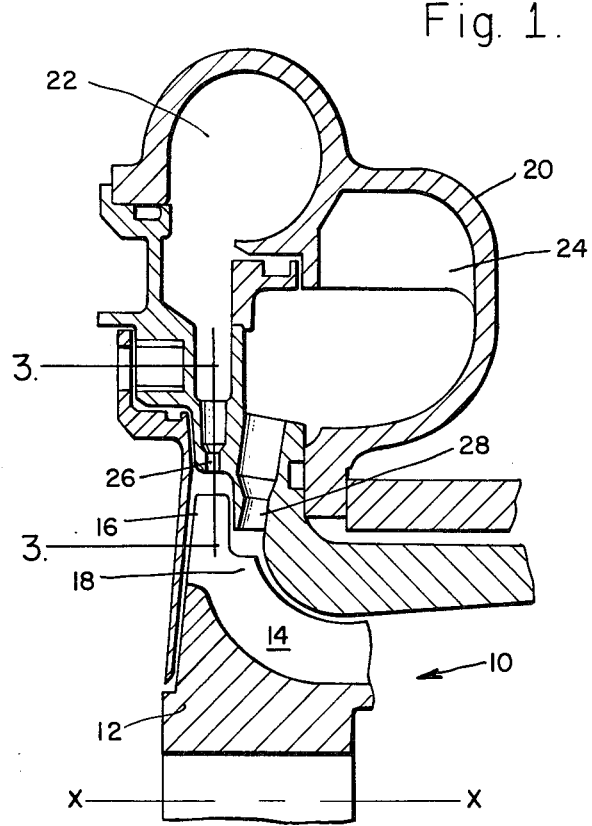
FIG. 1 is a sectional view of a radial flow dual stream turbine of the present invention.

Referring now to FIG. 1, there is shown a radial inflow turbine, shown generally at 10, comprising a hub section 12 and a blade section 14. The turbine member is supported for rotation about an axis "X"–"X". On the blade portion of the turbine 10 there are provided two inlet sections shown at 16 and 18. Radially outboard of the blade sections of the turbine there is provided a dual stream toroidal plenum shown generally at 20. This toroidal plenum is divided into two separate chambers shown at 22 and 24, and each is connected to a separate fluid source (not shown). The chamber 22 is provided with a series of nozzles spaced about the inside diameter of the chamber, one of which is shown at 26. These nozzles are for directing fluid under pressure from the chamber 22 to the blade section 16 of the turbine 10. The other chamber 24 within the plenum 20, is connected to a separate source of pressurized fluid and is provided with a series of nozzles 28 for directing the fluid from chamber 24 to the blade section 18 of the turbine 10. Thus each blade section of the turbine is provided with separate fluid source and nozzle assembly.

Figure 2:
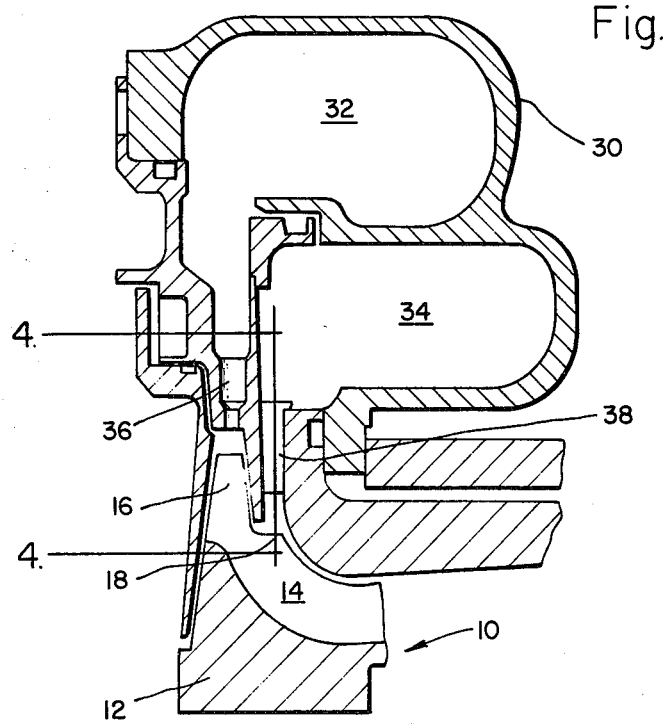
FIG. 2 is a sectional view of an alternate dual stream turbine of the present invention.

Referring now to FIG. 2, there is shown a similar embodiment having a turbine 10 with blade sections 16 and 18. The toroidal plenum 30 is divided into two chambers 32 and 34 as before. Chamber 32 is connected to the blade section 16 by means of nozzles 36. However, the fluid from chamber 34 is directed to blade section 18 of the turbine by means of a series of stationary vanes 38.

Figure 3:
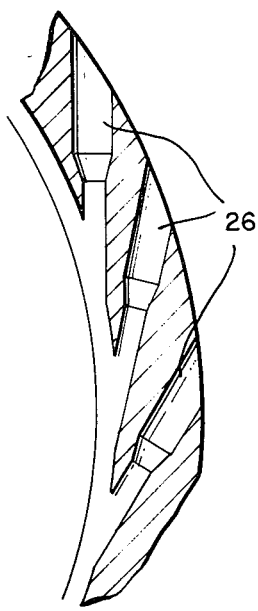
FIG. 3 is a sectional view taken along line 3—3 of FIG. 2.
Figure 4:
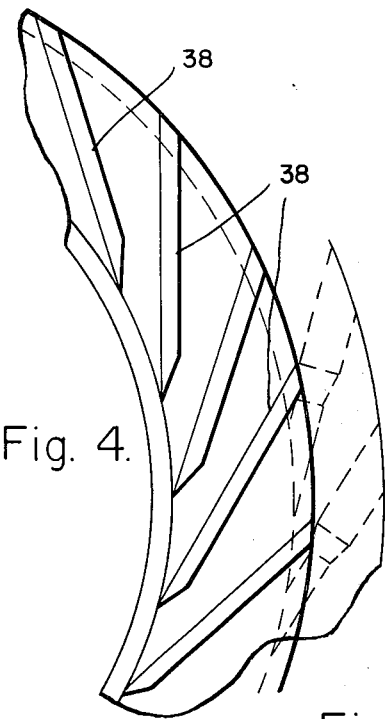
FIG. 4 is a sectional view taken along line 4—4 of FIG. 2.

In FIG. 3 there is shown a partial section taken through the nozzle assembly 26 showing the distribution of the nozzles around the periphery of the turbine. In FIG. 4 the stationary vanes 38, discussed in connection with FIG. 2 above, are shown in partial section.

Figure 5:
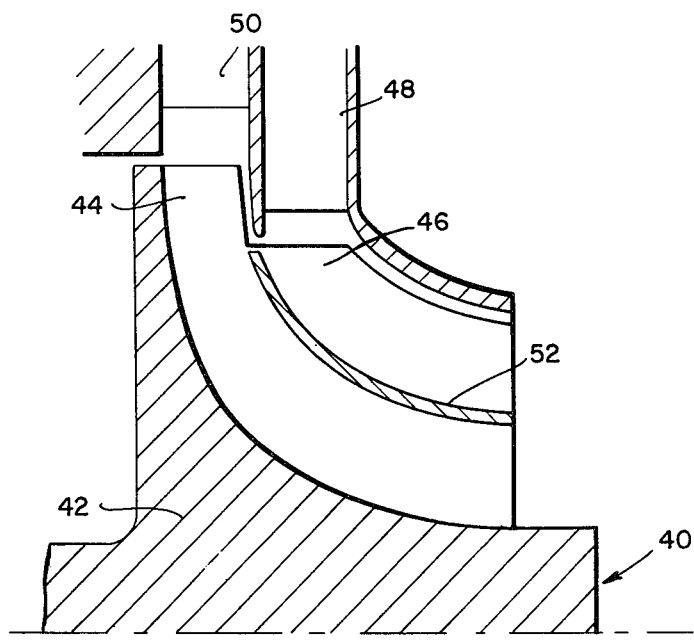
FIG. 5 is an enlarged sectional view illustrating a rotating shroud for a dual stream radial turbine.

Referring now to FIG. 5, there is shown another embodiment of the invention which provides a radial inflow turbine similar to that discussed in connection with FIGS. 1 and 2 above. The turbine 40 is provided with a hub member 42 and blade sections 44 and 46. Blade section 44 receives fluid directed through vanes 50 while blade section 46 receives fluid from another source by means of vanes 48. In this embodiment, however, where it is desirable to maintain the fluid flow in the two blade sections separate, there is provided a rotating shroud member 52 which rotates with the turbine. Thus, the fluid streams from the two sources are maintained separate as they are expanded through the turbine.

Figure 6:
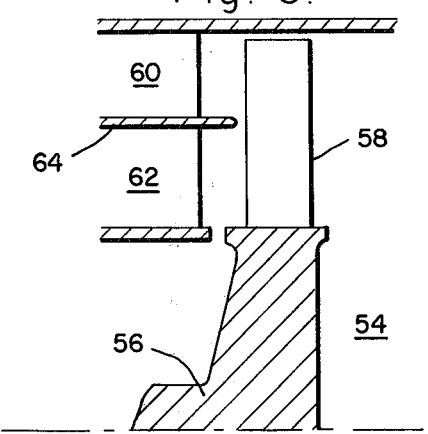
FIG. 6 is a partial sectional view of a dual stream axial turbine of the present invention.
Figure 7:
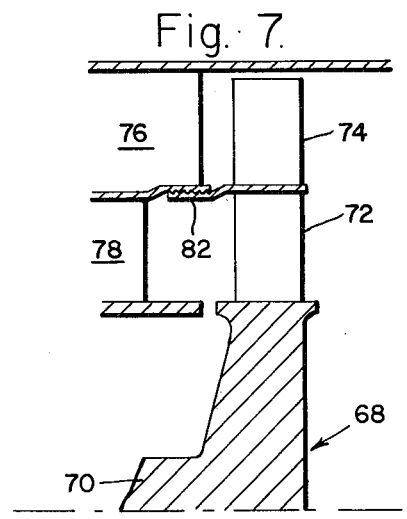
FIG. 7 is a partial sectional view of an alternate dual flow axial turbine having a rotating shroud.

Referring now to FIGS. 6 and 7, there are shown two embodiments of the invention as it is applied to axial flow turbines rather than radial inflow turbines. Thus in FIG. 6 the turbine 54 is provided with hub member 56 and a single blade section 58. Fluid from a first source is directed to the blade 58 by means of channel 60 while fluid from the second source is directed to another portion of the same blade by means of channel 62. The channels 60 and 62 are separated by a stationary shroud member 64. In FIG. 7 the turbine 68 with its hub member 70 is provided with a dual section axial blade whose sections are shown at 72 and 74. The blade section 74 receives fluid through channel 76 while the blade section 72 receives the fluid transmitted by channel 78. The two blade sections are separated by a rotating shroud member 80 and the two channels 76 and 78 are separated by means of a rotating labyrinth seal shown at 82.

Figure 8:
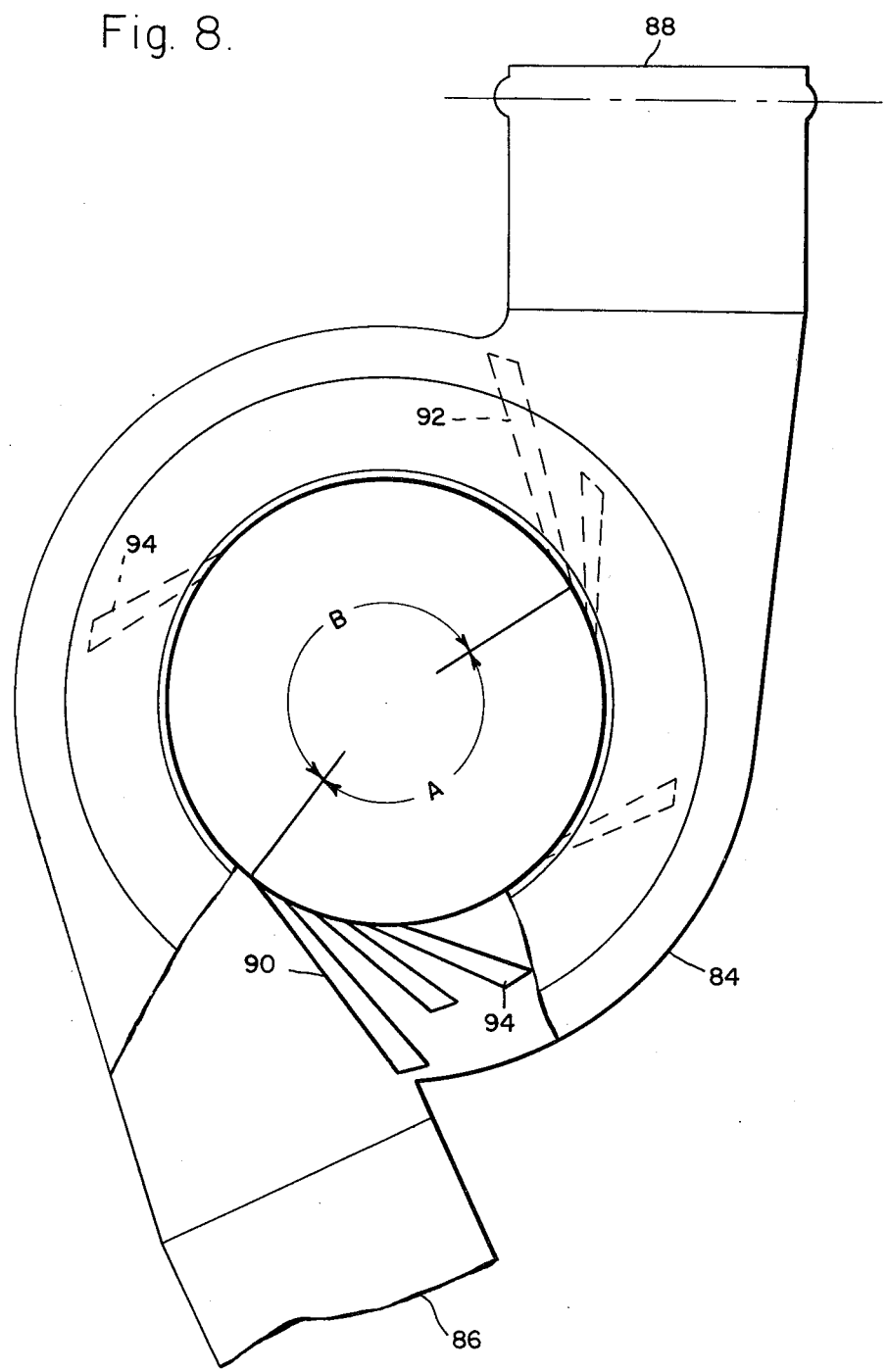
FIG. 8 is a view of a dual source scroll for a radial turbine.

Referring now to FIG. 8, there is shown another embodiment of the invention in which a toroidal chamber 84 surrounding a radial turbine is provided with two inlets 86 and 88 for accepting fluids from separate sources. In this embodiment the turbine blades of a radial inflow type will be uniform across their span but the fluids will be directed to different radial segments of the turbine. Thus the fluid entering opening 86 is inducted into the torus along bulkhead 90 and is directed to that portion of the turbine included within angle B. Within angle B the fluid is directed to the individual turbine blades by means of vanes 94. In similar manner the fluid entering opening 88 is directed along bulkhead 92 and impinges upon the turbine through the angle A between the two bulkheads. Thus the fluid from each source is directed to a different section of the turbine according to its particular parameters. While this embodiment is illustrated as showing two segments and two inlets, the embodiment may be practiced using any number of inlets depending on the number of fluid sources.

Referring now to FIGS. 9 and 10, there is shown another embodiment of the invention in which the axial turbine blades are uniform about the hub but the inlet to the turbine is divided into a plurality of segments each supplied from a separate fluid source. As best seen in FIG. 10, there is provided an axial flow turbine at 95 having blade members 96 spaced about its periphery. The turbine is mounted on a shaft member 97 for rotation about axes Z—Z. There are provided two turbine inlets shown at 98 and 100. Fluid from the first inlet 98 is directed by means of vanes 102 into one segment of the blades 96. Fluid from another source enters through turbine inlet 100 and impinges by means of vanes 104 on the other segment of the turbine 95. The two segments are separated by separator members 106 to divide the turbine inlet into two distinct segments providing an axial flow machine in which fluids from two different sources may be directed to separate sections of the turbine for optimum use of the energy contained in the fluid.

Radial turbines of this invention are understood to be either of the radial inflow type or the radial outflow type, each of which may employ the customary blade shapes that are associated with this type design, e.g., full length blades that terminate in an exducer as shown in FIGS. 1 and 2 or fractional blades or a combination of these. Cantilever blading is understood to fall in this catagory. For radial outflow turbines the nozzles will be arranged inside the blading. A variation of the nozzles shown in FIGS. 3 and 4 may be the so-called vaneless nozzles where vanes shown at 38 in FIG. 4 and 48 and 50 in FIG. 5 for example are eliminated. Either or all of the multi-stream nozzles may be equipped with vanes or be vaneless.

Thus it can be seen that there is provided herein means for utilizing a single turbine rotating element, whether of the axial or radial flow type which will accept multiple fluid streams from separate fluid sources. The fluid flow may be controlled and directed to that portion of the turbine which will most effectively use that fluid. Obviously many modifications and variations of the present invention are possible in light of the above teaching. It is therefore to be understood that within the scope of the appended claims the invention may be practiced otherwise and as is specifically described.

What we claim is:

1. In a radial flow turbo machine having a plurality of pressurized fluid sources for producing flow of at least two different fluid velocities, said machine comprising:
   a housing;
   a plurality of chambers in said housing, each chamber being connected to at least one of said sources;
   a turbine member having a plurality of blades, said blades being divided into a plurality of sections comprising at least two separate aerodynamic areas positioned axially along each blade, one of said blade areas having a radial dimension greater than that of an other of said blade areas; and
   fluid directing means beteen each of said chambers and one of said blade sections for directing fluid from said chambers to said blade sections, fluid from one of said chambers having a greater fluid velocity being directed to said one of said blade areas and fluid from the other of said chambers having a lesser fluid velocity being directed to said other of said blade areas.

2. The turbo machine according to claim 1 wherein there is provided between said blade areas a shroud member attached to said turbine member and rotatable therewith, said shroud member separating said blade areas.

3. The turbo machine according to claim 1 where said turbine is a radial inflow turbine.

4. The turbo machine according to claim 1 wherein said turbine is a radial outflow turbine.

5. The turbomachine according to claim 1 wherein said fluid directing means comprises nozzle means for directing fluid from each of said chambers to respective ones of said blade aerodynamic areas.

6. The turbomachine according to claim 1 wherein said fluid directing means comprises vane means for directing fluid from each of said chambers to respective ones of said blade aerodynamic areas.

7. The turbomachine according to claim 1 wherein said fluid directing means comprises nozzle means for directing fluid from one of said chambers to one of said blade aerodynamic areas and vane means for directing fluid from an other of said chambers to an other of said blade aerodynamic areas.

8. In combination:
   a plurality of sources or pressurized fluid for producing streams at different fluid velocities;
   a plurality of fluid chambers corresponding in number to the number of sources of pressurized fluid, each of said sources being connected to a corresponding one of said chambers;
   a radial flow fluid turbine mounted for rotation about an axis and juxtaposed said chambers, said turbine having a plurality of blades about its periphery, each of said blades having a plurality of aerodynamic sections arranged axially therealong corresponding in number to the number of said chambers and having different radial dimensions corresponding to the different fluid velocities; and
   fluid directing means at the outlet of each of said chambers for directing streams of pressurizied fluid from said chambers having greater fluid velocities to aerodynamic sections of said blades having greater radial dimensions and directing streams of pressuized fluid from said chambers having lesser fluid velocities to aerodynamic sections of said blades having lesser radial dimension.

9. The combination according to claim 8 and further comprising shroud means attached to said turbine and rotatable therewith for separating the fluid streams from said individual fluid directing means for flow along their respective aerodynamic sections.

10. The combination according to claim 8 wherein said turbine is a radial inflow turbine.

11. The combination according to claim 8 wherein said turbine is a radial outflow turbine.

12. The method of energizing a radial flow turbo machine having a plurality of blades from multiple fluid sources which produce streams of at least two different fluid velocities, said method comprising the steps of:

provided separate chambers connected to each fluid source;

dividing said turbo machine blades into a plurality of sections arranged axially therealong corresponding in number to the number of fluid sources and having at least two different radial dimension; and directing the fluid from each source of lesser fluid velocity to the section of said blades having a lesser radial dimension and directing the fluid from each source of greater fluid velocity to the section of said blades having a greater radial dimension.

* * * * *